United States Patent [19]

Kelm et al.

[11] Patent Number: 4,723,878
[45] Date of Patent: Feb. 9, 1988

[54] CLAMPING MEANS FOR MACHINE TOOL HOLDERS

[75] Inventors: Walter Kelm, Mr. Clemens; Paul Newland, Warren, both of Mich.

[73] Assignee: Carboloy Inc., Detroit, Mich.

[21] Appl. No.: 25,852

[22] Filed: Mar. 16, 1987

[51] Int. Cl.⁴ .............................................. B23C 5/26
[52] U.S. Cl. .................................. 409/234; 82/36 R; 82/36 B; 279/89; 409/232
[58] Field of Search .................. 82/36 R, 36 B, 36 A; 279/89, 1 TS; 409/231-234

[56] References Cited

U.S. PATENT DOCUMENTS 3,396,981 8/1968 Hammond ............................. 279/89
3,741,573 6/1973 Treer ...................................... 279/81

FOREIGN PATENT DOCUMENTS 990353 4/1965 United Kingdom .................. 279/89

Primary Examiner—Gil Weidenfeld
Assistant Examiner—Steven C. Bishop
Attorney, Agent, or Firm—Hedman, Gibson, Costigan & Hoare

[57] ABSTRACT

A clamping device for releasably securing a tooling adaptor in a tool clamp block which includes a generally cylindrical member having an eccentric slot formed about the periphery of the member for engaging the tooling adaptor in the cylindrical member whereby when the cylindrical member is rotated the tooling adaptor is drawn into and secured within the tool clamp block.

8 Claims, 4 Drawing Figures ed embodiment of the present invention, illustrating a
CLAMPING MEANS FOR MACHINE TOOL HOLDERS

BACKGROUND OF THE INVENTION

The present invention relates generally to tool clamping devices and more particularly to an improved device for quickly and securely clamping rotary tooling adaptors to tool clamp blocks.

In the machine tool industry, and particularly in automated systems, it is necessary to use a variety of machine tools to perform specific machining operations on a single work piece. Repeated changing of work tools results in considerable amount of downtime in the operation of the machine and consequently a loss of production time.

The replacement of a tool holder in a tool clamp block or spindle is ordinarily a manual operation, time consuming, laborious, and somewhat imprecise thereby requiring certain adjustments after replacement. If the replacement operation is automatic or semi-automatic, the mechanical strength requirements of the tool holding mechanism leads to the need for complex and powerful changing mechanisms usually based on hydraulic principles, especially to unclamp the tool holder.

In the prior art there have been developed numerous types of tool clamping devices intended to secure tooling adaptors to clamp blocks. However, such devices are not effective in significantly reducing the amount of downtime on a machine caused by a tool changeover, and are further complicated in structure and expensive to manufacture.

It is desirable, therefore, to have a quick release mechanism which is not dependent on complex equipment and lends itself to manual control as well as sophisticated automated tooling systems.

SUMMARY OF THE INVENTION

It is an object of the present invention to provide a new and improved clamping means for tool holders which provides direct axial pull on the tool holder shank and which is easy to handle, has simple construction and is relatively inexpensive.

It is another object of the invention to provide a simplified clamping mechanism capable of operating with minimum force and with minimum locking and unlocking motion of the mechanism.

To this end, there is provided a clamping mechanism positioned within a bore of a conventional tool clamp block adapted for receiving a rotary tooling adaptor therein.

The clamping mechanism comprises a cylindrical member having formed therein an eccentric or helical slot about the periphery of the cylindrical member. The clamping mechanism is mounted within a cylindrical bore provided in a conventional tool clamp block. The cylindrical bore is adjacent to and generally perpendicular to a cavity adapted for receiving the rotary tooling adaptor therein.

To secure a tooling adaptor in the tool clamp block according to the present invention, the clamping mechanism is inserted into the cylindrical bore of the tool block and set at a start or load position. A tooling adaptor is then inserted into the cavity of the tool block to a point where a retention knob, affixed to the inserted end of the tooling adaptor, enters and engages the eccentric slot of the cylindrical member. The cylindrical member is then rotated within the cylindrical bore of the tool block to axially displace the retention knob along with the tool adaptor, inwardly toward the center of the clamping mechanism thereby wedgingly securing the tooling adaptor in the cavity of the tool clamp block.

When it becomes necessary to replace the cutting tool adaptor, the clamping mechanism is reversibly rotated to the start position to effect an axial displacement of the tool adaptor in the opposite direction. The tooling adaptor is then removed from the clamp block, either manually or automatically, a replacement adaptor is inserted into the tool clamp block and the locking procedure is repeated again.

BRIEF DESCRIPTION OF THE DRAWINGS AND DETAILED DESCRIPTION OF THE INVENTION

The following is a detailed description together with the accompanying figures of an illustrative embodiment of the invention. It is to be understood that the invention is capable of modification and variation apparent to those skilled in the art within the spirit and scope of the invention.

Figure 1:
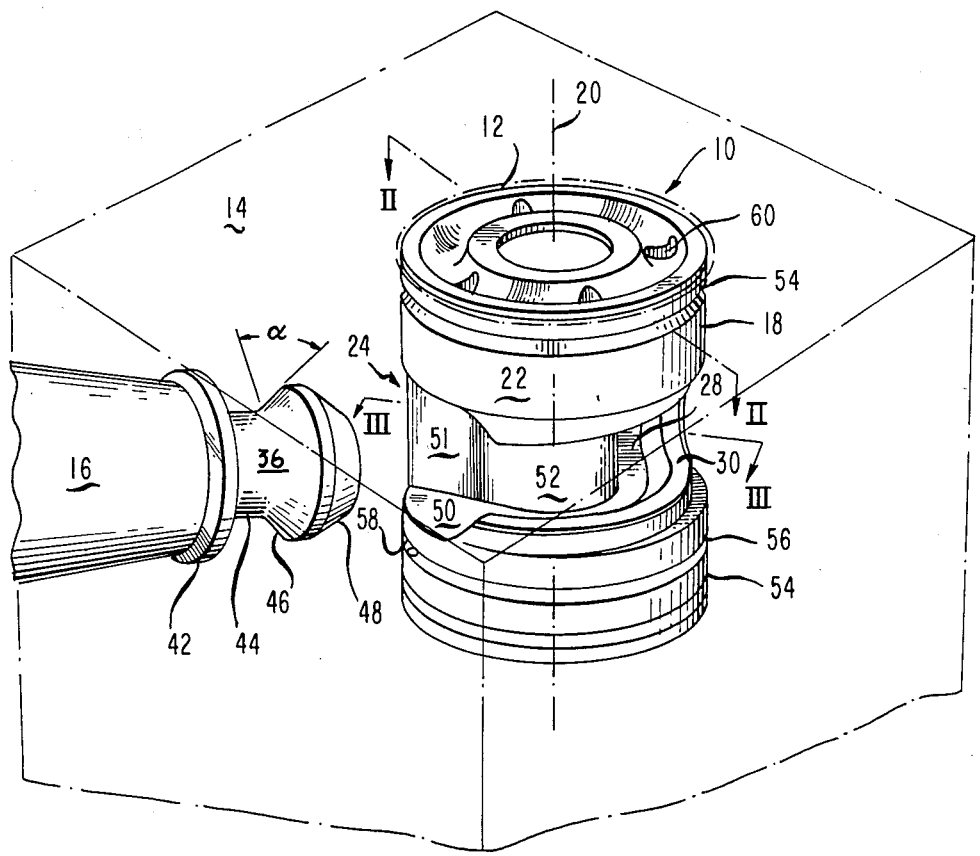
FIG. 1 is a perspective view employing a preferred embodiment of the present invention, illustrating a clamping mechanism incorporated in a conventional tool clamp block adapted for receiving a rotary tooling adaptor therein.

Referring to the drawings and first to FIG. 1, there is shown a preferred embodiment of a clamping mechanism 10 positioned within a bore 12 of a tool clamp block 14, adapted to receive a rotary tooling adaptor 16 therein.

The clamping mechanism 10 comprises a generally cylindrical member 18 having an axis 20 and an outside surface 22. An eccentric slot 24, having sufficient depth and height to accomodate a tooling adaptor 16 is provided in the surface 22 of the clamping mechanism 10.

Figure 2:
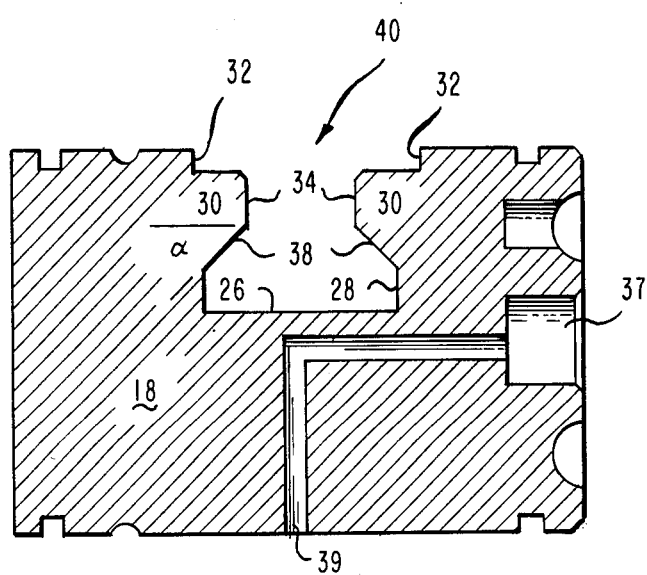
FIG. 2 is a cross-sectional view of the clamping mechanism of FIG. 1 as seen through section II—II.

Details of the eccentric slot 24 are more particularly illustrated in FIG. 2 which is a longitudinal cross-sectional view of the cylindrical member 18. As shown, the eccentric slot 24 includes an inner wall 26, a pair of opposing side walls 28, a pair of opposing shoulders 30 and a pair of outer rings 32. Each of said shoulders 30 comprises a top surface 34, an essentially vertical wall 36 extending from the top surface 34 to the outer ring 32 and a tapered wall 38 extending downwardly and outwardly from said top surface 34 to said side wall 28. An opening 40 to the slot 24, which is opposite to and coextensive with the inner wall 26, is provided in the outside surface 22. The angle $\alpha$ of the tapered walls 38 can vary from about 0° to 90° depending on the particular retention knob 36 employed on the tooling adaptor 16. A fitting is provided at one end of the cylindrical member 18 for accessing a lubricating conduit 39 extending through the member 18.

Referring again to FIG. 1, the retention knob 36 is conventional and threads into one end of the tooling adaptor 16. The retention knob 36 includes a shoulder 42, a neck 44, a conical gripping surface 46 and a tip 48. The conical gripping surface 46 tapers downwardly and outwardly from the neck 44 to the tip 48 at an angle $\alpha$ corresponding to the angle α of the tapered walls 38 of the eccentric slot 24. The angle α may be in the range of about 0° up to about 90°, preferably from about 10° to 45°. The angular mating of the conical surface 46 to the tapered walls 38 of the eccentric slot 24 provides area contact between the clamping mechanism 10 and the tooling adaptor 16 for drawing in and securing the tooling adaptor in the tool clamp block 14.

Figure 3:
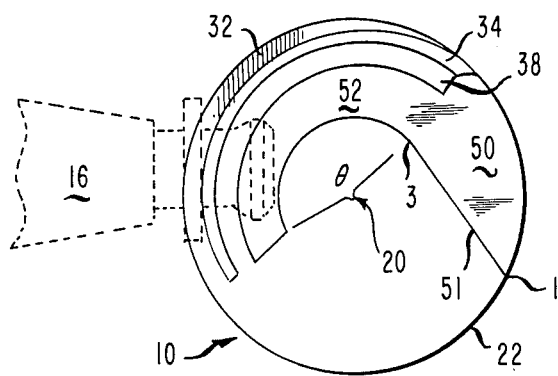
FIG. 3 is a cross-sectional view of the clamping mechanism of FIG. 1 as seen through section III—III.

Details of the camming schedule of the eccentric slot 24 are illustrated in FIG. 3 which is a cross-sectional view of the clamping mechanism 10 depicting the slot 24 with the retention knob 36 shown fully inserted in phantom. As shown, the slot 24 is constructed about the periphery of the clamping mechanism 10 in two distinct zones, a loading zone 50 and a cam or helical zone 52. The loading zone 50 extends from the outside surface 22 of the clamping mechanism 10, indicated indicated at numeral "1" to the start of the helical zone 52, indicated at numeral "3". The loading zone 50 comprises an essentially flat region 51 and provides a means for the retention knob to couple with the clamping mechanism 10. When inserting the tooling adaptor 16 in the tool clamp block 14, the clamping mechanism 10 is positioned in the bore 12 so that the loading zone 50 is substantially perpendicular to the axis of the tooling adaptor 16 to facilitate insertion of the retention knob 36 into eccentric slot 24.

The helical zone 52 of slot 24 extends in an arc about the axis 20 of the clamping mechanism 10. The arc angle θ of zone 52 may range from about 30° to 360°, preferably from 30° to 180°. The actual angle selected depends on the desired axial advance of the tooling adaptor 16 in the tool clamp block per degree of rotation of the clamping mechanism 10. The selected axial advance rate of the tooling adaptor 16 in the tool clamp block 14 produces either a hard or a soft lock of the tooling adaptor and thereby controls both the forces holding the tooling adaptor and the resistance to loosening.

In the preferred embodiment, the helical zone 52 radially advances toward the axis 20 of the clamping mechanism 10 at a constant rate or fixed helix. For example, if the selected axial advance is 0.0005" per degree revolution, a 180° rotation of the clamping mechanism 10 will result in a total adaptor axial advance of 0.09". Advance rates are generally selected from about 0.0001" to 0.005" advance per degree of rotation.

In an alternate embodiment, the helical zone 52 proceeds about the periphery in such a manner so as to produce a variable helix angle. This is accomplished by following the circumference of a circle having a diameter less than that of the cylindrical member 18, but which is tangent at one point to the diameter of member 18. The respective centerlines or axes are thus offset by a fixed amount. The helical zone 52 in this embodiment advances about the periphery of the smaller diameter circle. However, the maximum arc angle through which the tooling adaptor 16 is drawn inwardly into the tool clamp block 14 is limited to 180° in this embodiment.

Referring again to FIG. 3, the retention knob 36 is illustrated drawn into the slot 24. As shown, the conical gripping surface 46 of the retention knob 36 is in communication with the taper walls 38 of the slot 24. The outer ring 32 provides the necessary clearance for the shoulder 42 of the retention knob 36 as the clamping mechanism 10 is rotated and the retention knob is drawn toward the center of the mechanism 10. The opposing side walls 28 of slot 24 must be of sufficient depth so as to provide clearance between the tip 48 of the retention knob 36 and the inner wall 26 of the eccentric slot 24.

Referring again to FIG. 1, top and bottom grooves 54 are provided about the periphery of the cylindrical member 18 to accomodate O-rings for sealing the clamping mechanism 10 in the bore 12 of the tool clamp 14. A third groove 56 is provided in the cylindrical member for engaging a spring loaded set screw (not shown) positioned in the block 14. A bore 58 is strategically located in the groove 56 for engaging the set screw and positioning the clamping mechanism 10 so that the loading zone 50 is substantially perpendicular to the axis of the tooling adaptor 16. The groove 56, bore 58 and set screw arrangement assures that the mechanism 10 will be retained only at the load or start position.

Figure 4:
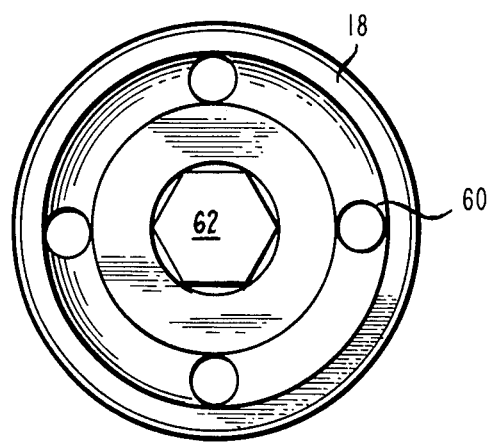
FIG. 4 is a top view of the clamping mechanism of FIG. 1.
Figure 2:
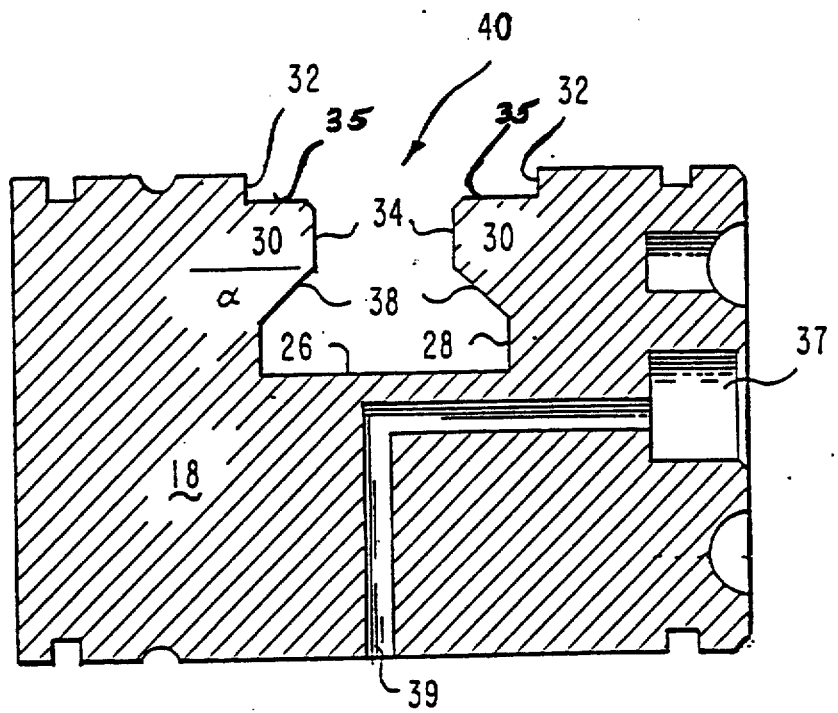

FIG. 4 is a top view of the clamping mechanism 10, illustrating several alternate means for rotating the clamping mechanism, either manually or automatically. Specifically, hollows 60 may be provided about the periphery of the cylindrical member 18 for receiving pin drives, e.g., a spanner wrench. Alternatively, a bolt head 62 or recess may be axially positioned in the top of the cylindrical member 18 for rotating with an appropriate drive.

The operation of the clamping mechanism 10 is best understood with reference to FIGS. 1 and 3, which depict the mechanism in unlocked and locked positions, respectively. Referring first to FIG. 1, there is illustrated the clamping mechanism 10 in an unlocked position in the bore 12 in the tool clamp block 14. The clamping mechanism 10 is positioned such that the loading zone 50 of the eccentric slot 24 is substantially perpendicular to the retention knob 36 of the tapered tooling adaptor 16 positioned in the tool block 14.

To secure the tooling adaptor 16 in the tool block 14, the adaptor 16 is inserted into a cavity in the block 14 and the retention knob 36 enters the eccentric slot 24 at the loading zone 50. An appropriate tool (not shown) is inserted into the rotating means 60 of the clamping mechanism 10 and a torque is applied to the mechanism 10. A clockwise rotation of the mechanism 10 results in the retention knob entering the helical zone 52 whereby the retention knob 36 is continuously drawn toward the center of the mechanism 10 resulting in an axial translation of the adaptor 16 within the cavity of the block 14. As the mechanism 10 is rotated, the tooling adaptor 16 continues to be drawn into the block 14 until the adaptor wedgingly engages the cavity of the tool clamp block 14.

It is important to note that clearance is maintained between the inner wall 26 of the slot 24 and the tip 48 of the retention knob 36. In addition, clearance is maintained between the neck 44 of the retention knob and the opposing top surfaces 34 of the shoulders 30 of the slot 24. In the assembled or locked state, the conical gripping surface 46 of the retention knob 36 mates with the tapered walls 38 of the slot 24.

Finally, removal of the tooling adaptor is accomplished by rotating the clamping mechanism 10 in the opposite direction, thereby imparting an axial movement of the tooling adaptor 16 away from the center of the clamping mechanism. As the retention knob 36 re-enters the loading zone 50, the tip 48 engages the flat region 51 which provides a slight axial movement of the tooling adaptor 16. The small "kick" essentially frees the outer surface of the tooling adaptor 16 from the inside surface of the cavity thereby providing for easy removal of the adaptor from the tool clamp block 14.

While there has been described herein what is considered to be the preferred embodiment of the invention, the invention in its broadest aspects is not limited to the described embodiment and departures may be made therefore within the scope of the accompanying claims without departing from the principles of the invention and without sacrificing its chief advantages.

We claim:

1. A clamping mechanism for releasably securing a tooling adaptor in a tool clamp block comprising:

a generally cylindrical member having an eccentric slot formed about the periphery of said member and including means for engaging the tooling adaptor in said cylindrical member; and means for rotating said cylindrical member whereby the tooling adaptor is drawn into and secured within the tool clamp block.

2. The clamping device according to claim 1, wherein the tool clamp block has a first bore adapted to receive said cylindrical member, said first bore being adjacent to and perpendicular to a second bore in the tool clamp block, adapted to receive the tooling adaptor, wherein the adaptor is inserted in said second bore to a point where the adaptor engages the eccentric slot in said cylindrical member and wherein said cylindrical member is rotated to draw in and secure said tooling adaptor within the second bore of the tool clamp block.

3. A clamping device for releasably securing a tooling adaptor in a tool clamp block, comprising:

a cylindrical member having an axis and including an eccentric slot formed about the periphery of said member in a plane perpendicular to the axis of said cylindrical member, said slot having means for engaging the tooling adaptor; and means for rotating said cylindrical member whereby the tooling adaptor is drawn into and secured within the tool clamp block.

4. The clamping device according to claim 3, wherein said eccentric slot is comprised of two distinct zones, including a loading zone and a helical zone.

5. The clamping device according to claim 4, wherein said helical zone comprises an arc angle between 30° and 360°, through which the eccentric slot radially advances toward the axis of said cylindrical member.

6. The clamping device according to claim 4, wherein said loading zone comprises a flat region for receiving a retention knob affixed to one end of the tooling adaptor.

7. The clamping device according to claim 5, wherein the eccentric slot radially advances toward the axis of said cylindrical member at a fixed rate.

8. The clamping device according to claim 5, wherein the arc angle of said helix zone is preferably between 30° and 260°.

* * * * *

UNITED STATES PATENT AND TRADEMARK OFFICE
CERTIFICATE OF CORRECTION

PATENT NO. : 4,723,878

DATED : February 9, 1988

INVENTOR(S) : Walter Kelm et al

It is certified that error appears in the above—identified patent and that said Letters Patent is hereby corrected as shown below:

Column 2, line 52, change "36" to -- 35 --.

Column 3, line 17, delete the second occurrence of "indicated".

In the Drawings:

Amend FIGURE 2 in accordance with the attached sheet.

Signed and Sealed this

Thirty-first Day of January, 1989

Attest:

DONALD J. QUIGG

Attesting Officer

Commissioner of Patents and Trademarks